United States Patent [19]
Eck et al.

[11] Patent Number: 5,025,645
[45] Date of Patent: Jun. 25, 1991

[54] WASHING MACHINE

[75] Inventors: Werner Eck, Herzogenaurach; Ernst Harrsch, Marbach; Friedrich Geiger, Heilbronn, all of Fed. Rep. of Germany

[73] Assignee: Passat-Maschinenbau GmbH, Fed. Rep. of Germany

[21] Appl. No.: 356,686

[22] Filed: May 25, 1989

[30] Foreign Application Priority Data

Jun. 6, 1988 [DE] Fed. Rep. of Germany ....... 3819238

[51] Int. Cl.$^5$ ............................................. D06F 31/00
[52] U.S. Cl. ........................................ 68/27; 68/140; 68/58
[58] Field of Search ..................... 68/27, 139, 140, 58; 384/510, 909

[56] References Cited

U.S. PATENT DOCUMENTS

| | | | |
|---|---|---|---|
| 2,300,690 | 11/1942 | Neuman | 68/58 X |
| 3,210,969 | 10/1965 | Sulzmann | 68/58 |
| 3,247,960 | 4/1966 | Kahn | 68/58 X |
| 3,293,891 | 12/1966 | Sulzmann | 68/58 |
| 3,503,230 | 3/1970 | Sulzmann | 68/58 |
| 3,995,458 | 12/1976 | Grunewald et al. | 68/140 |
| 4,287,730 | 9/1981 | Grunewald et al. | 68/140 |

FOREIGN PATENT DOCUMENTS

| | | |
|---|---|---|
| 2606350 | 9/1976 | Fed. Rep. of Germany . |
| 2527502 | 12/1977 | Fed. Rep. of Germany ........ 68/140 |
| 1050985 | 1/1954 | France . |

Primary Examiner—Frankie L. Stinson
Attorney, Agent, or Firm—Wigman & Cohen

[57] ABSTRACT

In order to improve the mounting of the drums 15 in drum-type washing machines, a bearing ring 31 which is at least partially exchangeable through an opening in the housing 13 of the washing machine is arranged between the cylindrical bearing connection piece 29 of the drum 15 and a bearing shell 26 fixed on the housing.

16 Claims, 7 Drawing Sheets

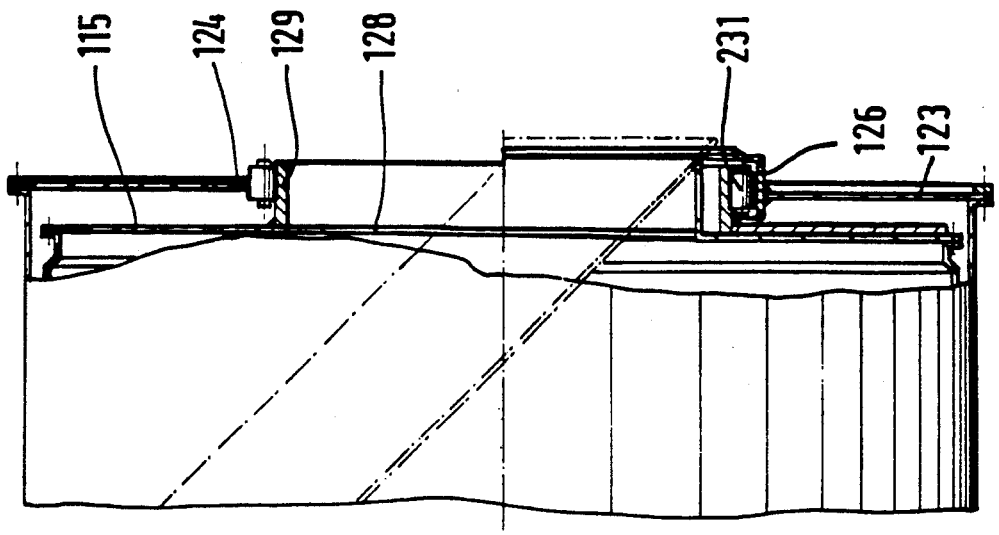
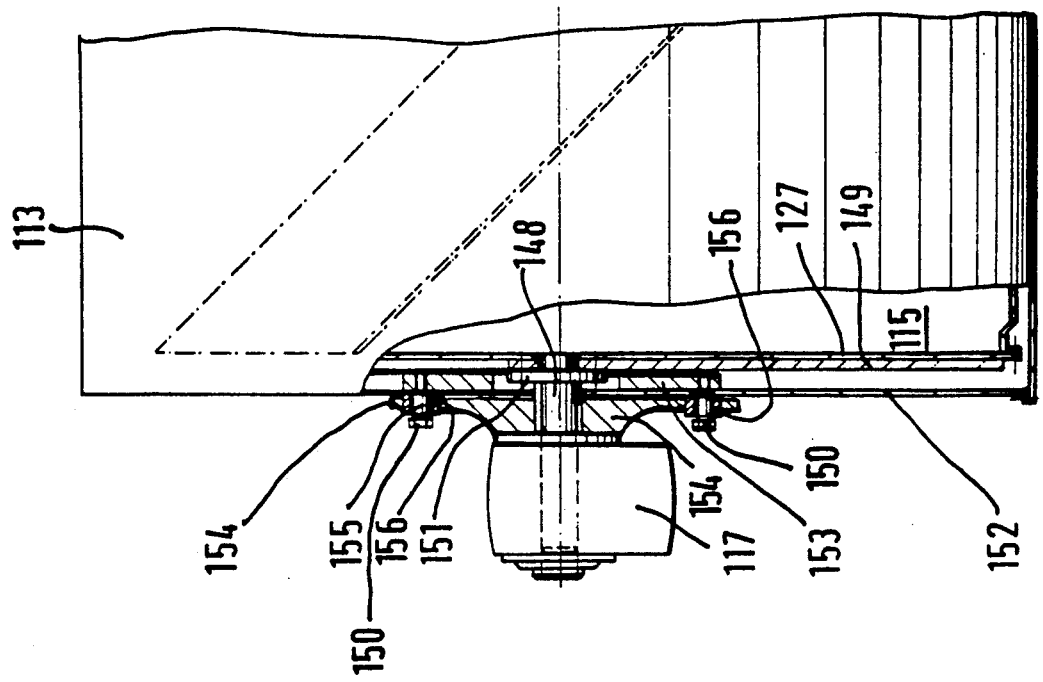

WASHING MACHINE

BACKGROUND OF THE INVENTION

1. Field of the Invention

The invention relates to a washing machine with a drum which is mounted in a housing and has in at least one end wall thereof an opening for introduction of the material to be washed and/or removal of the washed material. The drum is rotatably mounted by means of a cylindrical connection piece surrounding the drum opening on a cylindrical bearing shell provided on the housing and is driven by a drive means.

2. Description of the Related Art

A washing machine of this kind for batches of material passing from one drum to the next is known from German Patent 2,606,350. In this known washing machine, the bearing of the drum is designed as sliding bearing. The bearing shell of the housing consists of a plastic material, while the connection piece of the drum is made of the drum material, i.e., of steel. This results in the bearing shell wearing relatively quickly in its lower region.

Replacement of the worn bearing shell involves great effort.

SUMMARY OF THE INVENTION

The object underlying the invention is to improve the washing machine referred to at the beginning.

This object is accomplished in accordance with the invention by the connection piece being mounted on the bearing shell by means of a bearing ring surrounding the connection piece, by the bearing ring being integral and divided or comprising releasable bearing members and by an opening being provided in the housing for exchanging the bearing ring or at least one bearing member.

Hence the bearing shell and similarly the connection piece may be made of steel and, consequently, have a long service life. This service life can be substantially prolonged by a suitably designed bearing ring. Accordingly, the invention enables the wear to be diverted mainly to the bearing ring with either the entire bearing ring or at least a single bearing member thereof being easily exchangeable when worn. Renewal of the bearing ring or single bearing members results in a service life of the bearing of the inventive washing machine which is considerably longer than that of the known washing machine. In addition, replacement of the worn bearing is extremely simple.

In an advantageous embodiment of the invention, rollers which are releasably connected to one another to form the bearing ring are provided as bearing members. The rollers may be articulatedly connected by links to form a roller chain or they may be joined between two closed rings to form a cage roller bearing.

In a further advantageous embodiment, exchangeable ring segments are provided as bearing members.

These ring segments may comprise rotatably mounted rollers to form at least one bearing surface. The ring segments may be articulatedly connected to one another to form the bearing ring. The two bearing surfaces of the bearing ring on the bearing shell and on the connection piece may be formed by the rollers protruding on both sides from the ring segments. The ring segments may, however, also be attached to the drum connection piece if the rollers protrude from the ring segments on one side only to form only one bearing surface with the bearing shell.

It is also possible for the bearing members to be designed as sliding elements. In this case, it is advantageous for at least that sliding surface of the ring segments facing the opposite surface, for example, the bearing shell, to be made of a material, for example, a plastic material which is softer than the material of the opposite surface. By joining the ring segments to the connection piece of the drum, only the radially outer surface of the sliding elements forms a sliding surface with the bearing shell.

If sliding elements are used as bearing members, dirt, for example, dust, chips or the like may get into the sliding bearing, which increases the wear of the sliding surfaces. In order to remove this dirt, provision is made in a further advantageous embodiment for the sliding surface of at least one ring segment to contain at least one transverse groove and for the longitudinal axis of the transverse groove to form an acute angle with the circumferential direction of the ring segment. In this case, the angle of the transverse groove may be so selected that in the direction of rotation of the drum during the washing operation, the dirt entering the transverse groove travels along it in a direction which leads out of the drum. If, in this case, the bearing shell acts as bearing for the connection pieces of two neighboring drums which face each other, it may have in its lower region and between the two connection pieces a hole which connects the bearing surface with the outer area of the drums.

The angles of the transverse grooves in the sliding elements of the two drums may be so selected that in a direction of rotation of the two drums the dirt is moved into the center of the bearing shell and then carried away between the two neighboring ring segments through the hole in the bearing shell into the outer area of the drum within the housing from where it travels into a zone of the washing solution from which it can no longer reach the drum and the sliding bearing.

The opening in the housing for exchanging the bearing members may be provided at any suitable point. Washing machines are known wherein the drive of the drum is arranged on the outside of the housing and in the housing there is an engagement opening through which the drive wheel of the drive meshes with the teeth of a gear rim extending around the drum.

In a further advantageous embodiment of the invention, the opening for exchanging a bearing member may be formed by an extension of this engagement opening.

In order that the bearing shell does not impede exchange of the bearing ring or a bearing member, provision may, furthermore, be made for the bearing shell to extend only around the lower circumference of the connection piece, thereby leaving the space in the upper circumferential region of the connection piece free for exchange of the bearing member.

In the washing machines with several drums for batches of material passing from one drum to the next, both end walls of the drums have openings for introducing the material to be washed and/or removing the washed material. This is, however, not necessary in radially fed single-drum washing machines. Herein, provision may be made in accordance with the invention for the connection piece to be mounted at the delivery end of the drum by means of the inventive bearing ring. At the feeding end, the drum may, however, be mounted by means of a shaft which engages the gear bearing of a geared motor. In this case it is, however, difficult to achieve coaxial arrangement of the two different mountings.

Therefore, in this case, provision is made in an advantageous embodiment of the invention for the geared motor to be elastically mounted on the housing by means of at least one elastomeric element. The manufacturing tolerances of an arrangement of the two mountings which is not exactly coaxial can be compensated by the resulting elasticity. In addition, the vibrations caused by the turning of the material being washed in the drum are thereby damped. The direct connection of the drum to the geared motor also simplifies the mounting of this end of the drum.

The invention is set forth in detail but in schematically simplified form in the following description of embodiments illustrated in the drawings.

BRIEF DESCRIPTION OF THE DRAWINGS

The drawings show:

FIG. 13: an illustration of an embodiment of a single-drum washing machine, corresponding to FIG. 1, illustrated in the region of the drum bearings partially in vertical axial section.

DESCRIPTION OF PREFERRED EMBODIMENTS

Figure 1:
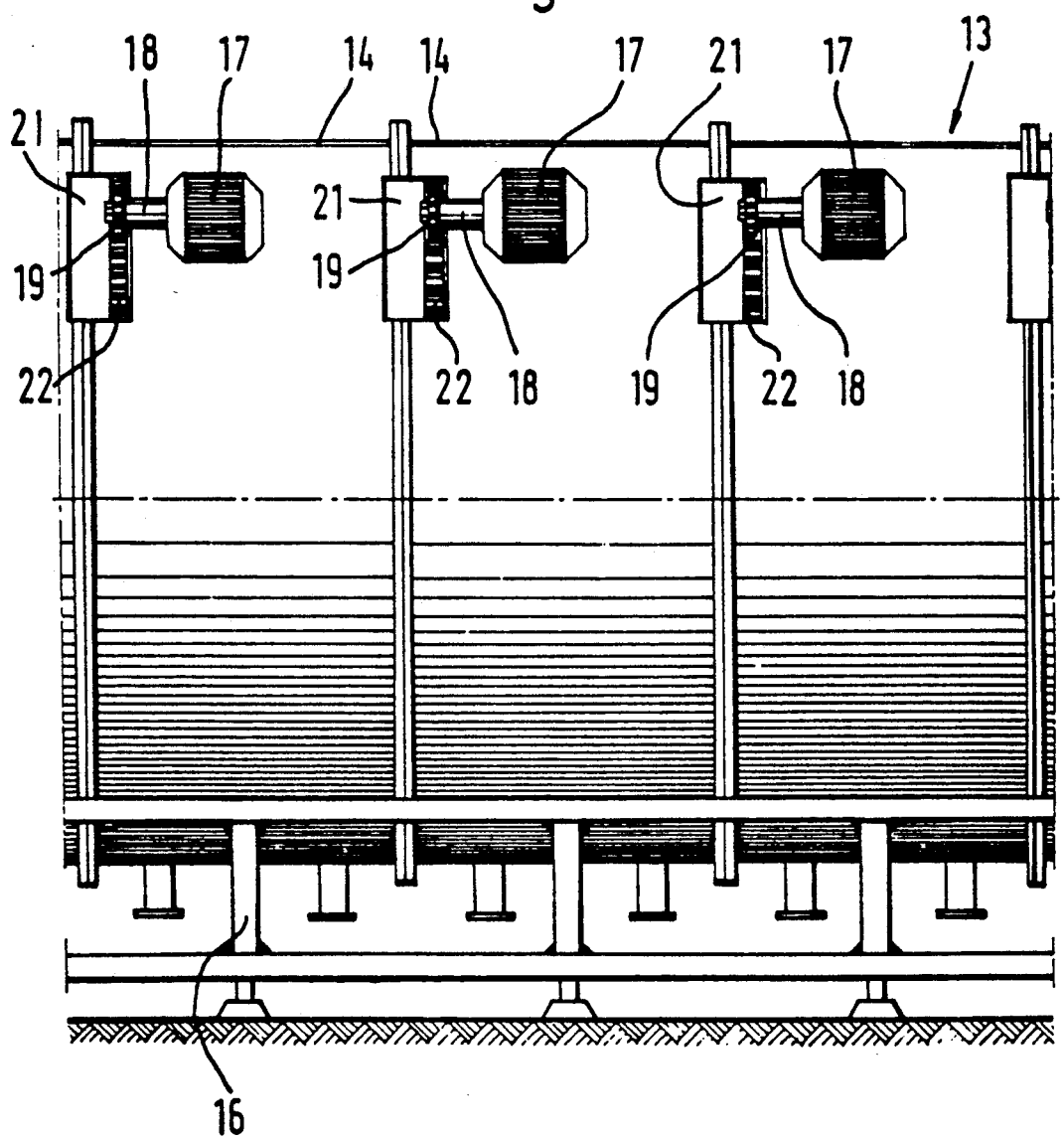
FIG. 1: an embodiment designed as washing machine with several drums for batches of material passing from one drum to the next in a side view broken off at both ends.

FIG. 1 shows a washing machine for batches of material passing from one drum to the next. The housing 13 of this washing machine consists of several housing sections 14 which are connected to one another in a flanged-like manner. A drum 15 (FIG. 2) is mounted for rotation about a central horizontal axis in each housing section 14. The entire housing 13 is carried by a frame 16. Each drum 15 has an associated drive of its own in the form of a geared motor 17 mounted on the outside of the wall of each housing section 14. A gear 19 is attached to the end of the shaft 18 of each motor 17. An engagement opening 21 is provided for this gear in the wall of the housing 13. The gear 19 extends through the engagement opening 21 into the interior of the respective housing section 14 and meshes there with a gear rim 22 mounted on the circumference of the drum. Since this way of driving the drums of a washing machine for batches of material passing from one drum to the next is known, the gear rim 22 is not illustrated in FIG. 2. As is evident from FIG. 1, for a reason which will be explained hereinbelow, the engagement opening 21 is illustrated larger than would be required for engagement of the gear with the gear rim 22.

The interiors of the individual housing sections 14 are separated from one another by partition walls 23. The end faces of the housing 13 are formed by terminating walls similar to the partition walls 23. Such a terminating wall 123 is illustrated on the right in FIG. 13.

Each of the partition walls 23 comprises a round opening 24 which is coaxial with the axis of rotation of the drum 15 and is delimited by an opening rim 25. A bearing shell 26 made of rust-proof steel is attached, for example, welded to the bottom semicircle of this opening rim 25. The bearing shell 26 acts as bearing for the two drums 15 located on different sides of the partition wall 23.

For introduction of the material to be washed into the drum and/or removal of the washed material from the drum, each drum 15 comprises in each of its two end walls 27 one opening 28 which is coaxial with its axis of rotation. A cylindrical connection piece 29 is attached to the rim of the respective end wall 27 surrounding this opening 28. The respective drum 15 is mounted on the respective bearing shell 26 by means of this connection piece 29. As is apparent from FIG. 2, one bearing shell 26 serves as bearing for the connection pieces 29 of the drums 15 of two neighboring housing sections 14.

Figure 2:
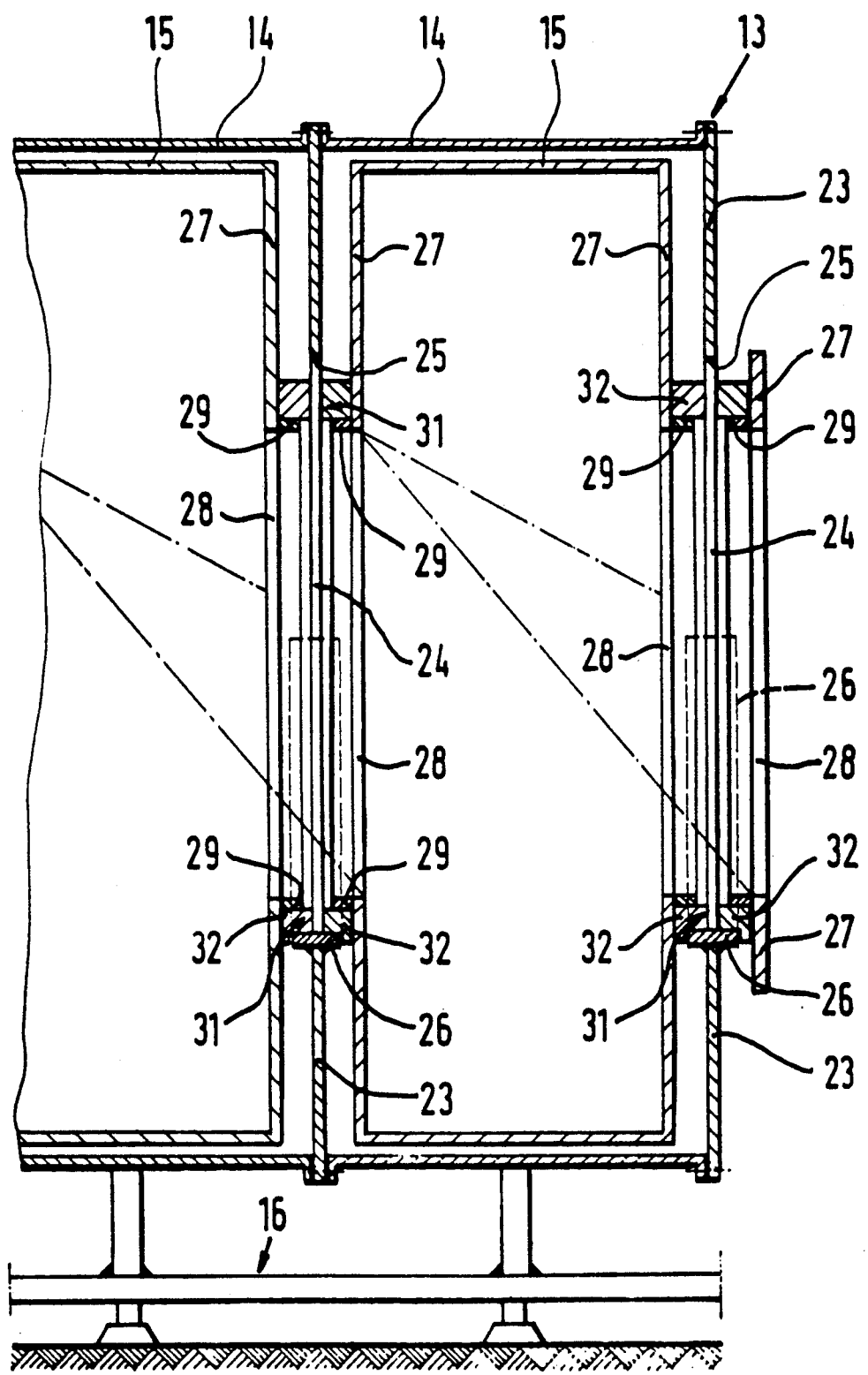
FIG. 2: a vertical axial section of the embodiment of FIG. 1.
Figure 3:
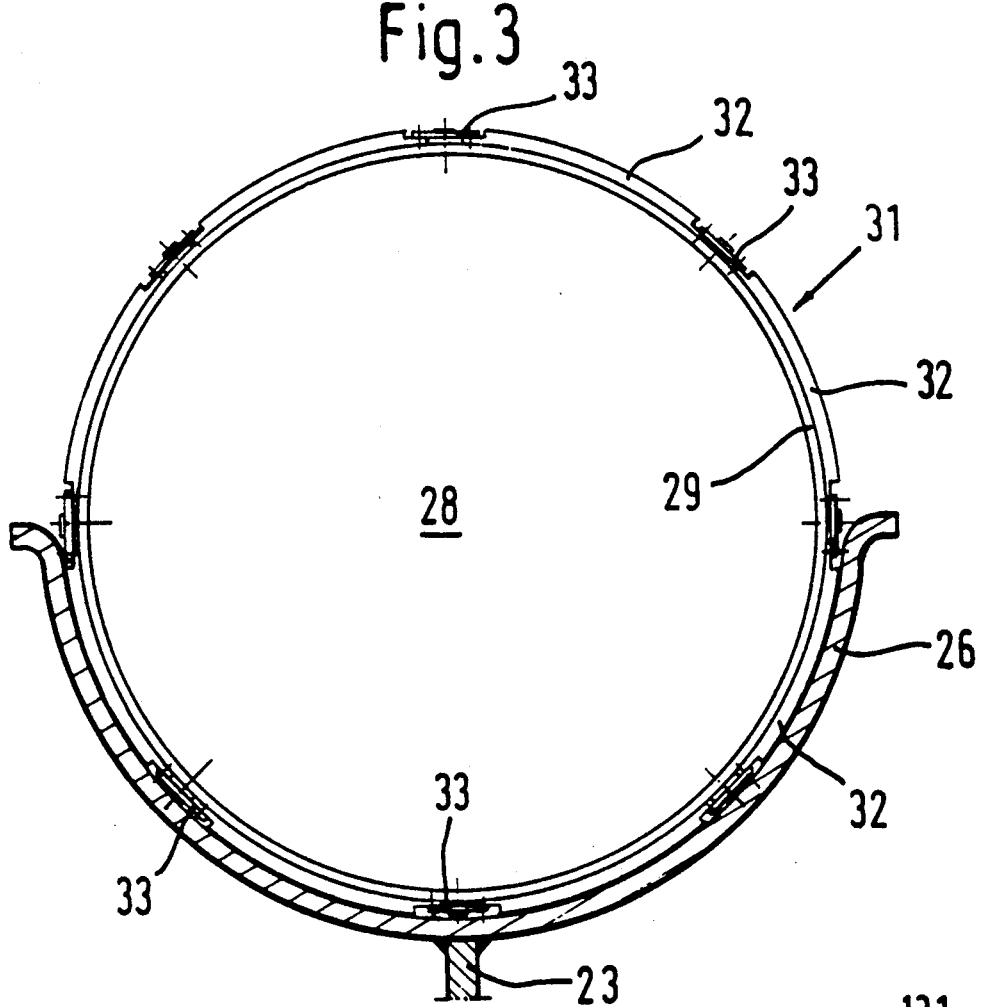
FIG. 3: the bearing connection piece of a drum with a first embodiment of a bearing ring surrounding the bearing connection piece in an end view seen in the axial direction with bearing shell and partition wall illustrated in section.

In the embodiment according to FIGS. 2 and 3, a bearing ring 31 comprised of ring segments which are connected to one another is provided as bearing for each connection piece 29. In the first embodiment of a bearing ring illustrated in FIGS. 2 and 3, these ring segments are designed as sliding elements 32 which are connected to one another by connecting links 33 attached to the respective drum connection piece 29.

In this way, only the radially outer surfaces of the sliding elements 32 form sliding surfaces with which they slide on the respective bearing shell 26. The sliding elements preferably consist of a suitable plastic material. They may, however, also consist of a different material, for example, metal and be coated on the side forming the sliding surface, i.e., the radially outer side, with a softer material than the material of the bearing shell 26, for example, with a plastic material.

Owing to at least the radially outer sliding surfaces of the sliding elements 32 consisting of a softer material than the bearing shells 26, the bearing shells 26 are subjected to practically no wear during operation of the washing machine. The abrasion by friction occurs essentially only on the sliding elements 32. These can, however, be easily exchanged through the above-mentioned extension of the engagement opening 21 in the upper region of the openings 24 owing to the absence of the bearing shell there. Therefore, if individual or all of the sliding elements 32 become worn during operation they can be easily exchanged without great effort and so operation of the washing machine can be easily started again with new sliding elements without the washing machine having to be disassembled.

Figure 4:
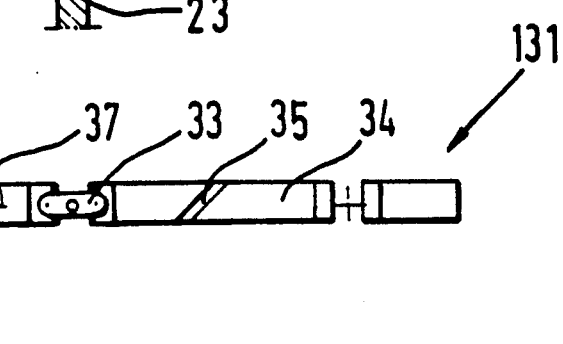
FIG. 4: a radially outward view of the second embodiment of the bearing ring which is a slight modification of the design of FIG. 3.
Figure 5:
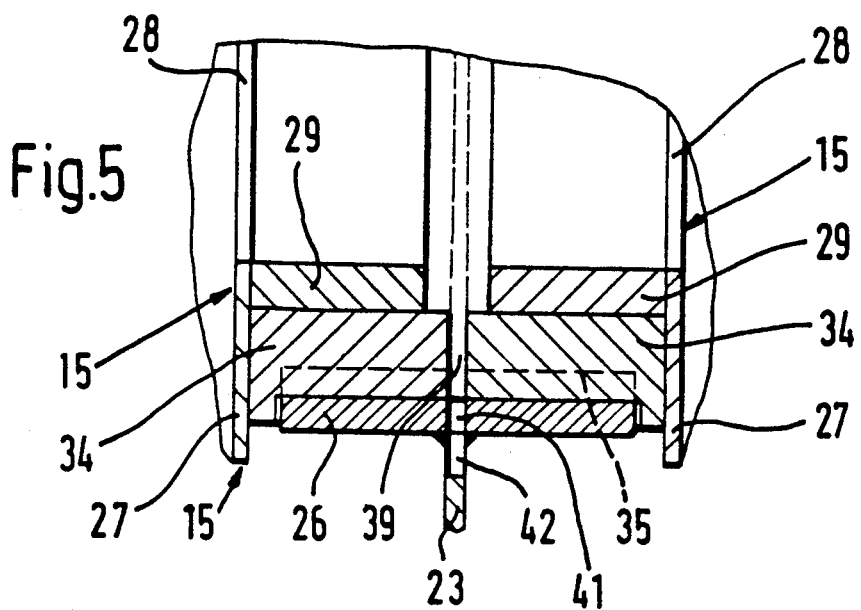
FIG. 5: the second embodiment of the bearing ring of FIG. 4 in an illustration which corresponds to a sector of the axial section according to FIG. 2.

In the second embodiment of a bearing ring 131 illustrated in FIGS. 4 and 5, the sliding elements 34 are slightly modified with respect to the sliding elements 32. This modification consists in the sliding elements 34 comprising at least one transverse groove 35 each in their radially outer sliding surface. These transverse grooves extend over the entire width of the sliding surface of the respective sliding element 34. The longitudinal axis of each transverse groove 35 forms an acute angle 37 with the circumferential direction 36 (FIG. 4) of the sliding element 34 so that dirt particles which have entered the transverse groove 35 are moved by the friction at the bearing shell 26 along the transverse groove 35 in the direction of arrow 38 shown in FIG. 4. As is evident from FIG. 5, there is a gap 39 between the sliding elements 34 of the two bearing rings 131 provided on two different sides of the partition wall 23 for the two drums 15 mounted on either side of the partition wall 23. A hole 41 is provided in the bearing shell 26 at the lowest point thereof in the region of this gap 39. Underneath the bearing shell 26, the hole 41 opens into a radial extension 42 of the round opening 24 of the partition wall 23.

The transverse grooves 35 are so inclined about the acute angles 37 in the sliding elements 34 of the neighboring bearing rings that they guide the dirt particles into the gap 39 when both drums rotate in the same direction during the washing operation. The dirt particles then pass through the hole 41 and the opening extension 42 into the outer areas of the drums 15 into a zone of the washing solution from where they can no longer get into the drum and, consequently, also no longer reach the sliding bearing. In this way, automatic cleaning of the sliding bearings is achieved with the transverse grooves 34.

Figure 6:
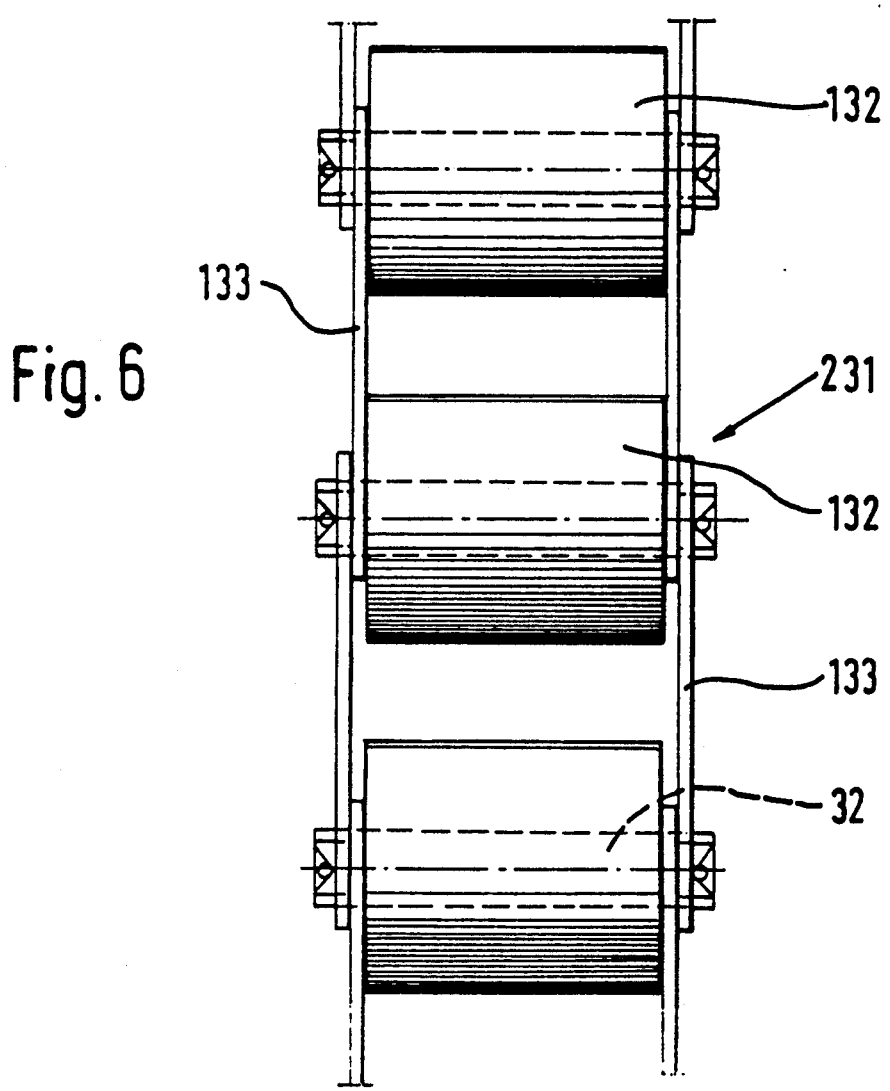
FIG. 6: an illustration of a third embodiment of the bearing ring corresponding to FIG. 4, but considerably enlarged.
Figure 7:
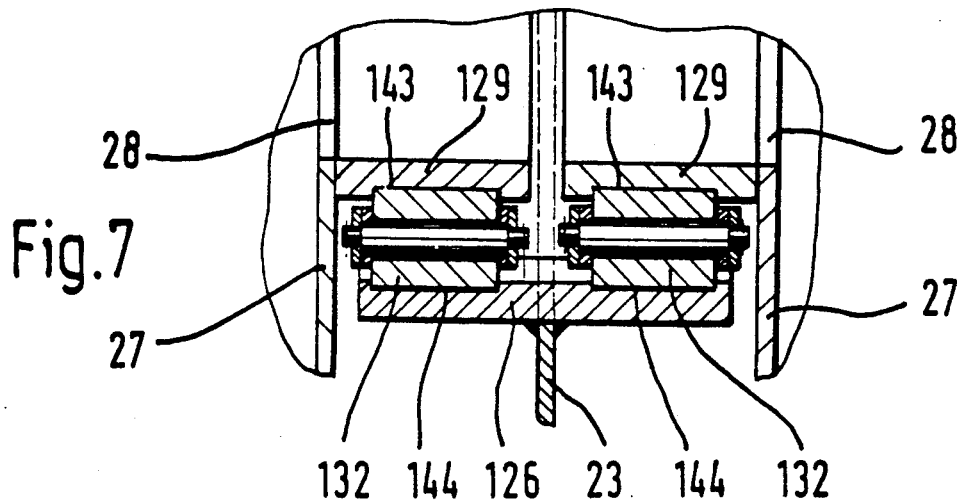
FIG. 7: an illustration of the third embodiment of the bearing ring corresponding to FIG. 5.

The third embodiment of a bearing ring 231 illustrated in FIGS. 6 and 7 comprises as bearing members rollers 132 which are releasably and articulatedly connected to one another by links 133 to form a roller chain. As is apparent from FIG. 7, guide grooves 143 and 144, respectively, are provided in both the connection pieces 129 and the bearing shell 126 to guide the rollers 132.

In this embodiment of a bearing ring designed as a roller chain, the individual rollers are also easy to exchange through the extended engagement opening 21. In addition, this roller chain forms an antifriction bearing for the drum and so the wear of this bearing is thereby substantially reduced.

Figure 8:
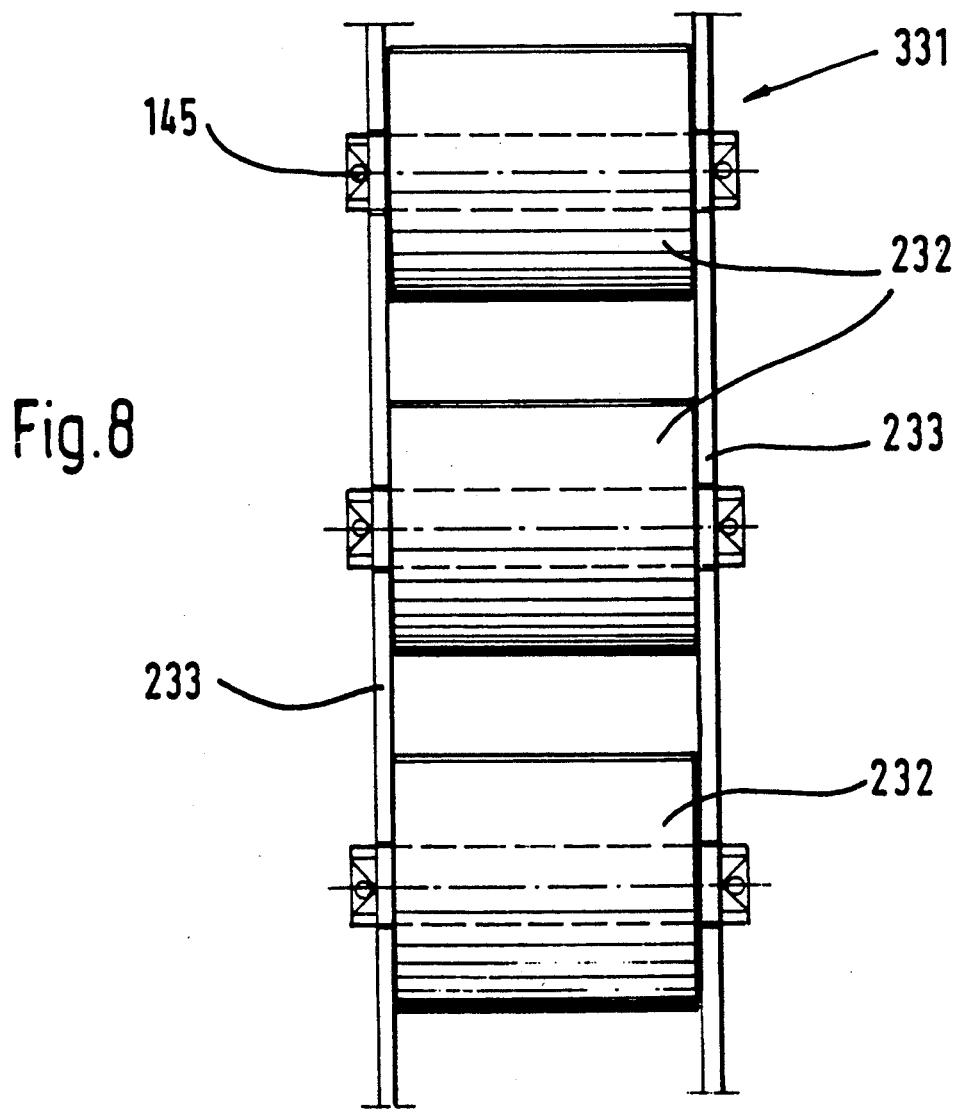
FIG. 8: an illustration of a fourth embodiment of the bearing ring corresponding to FIG. 6.

A fourth embodiment of the bearing ring 331 is illustrated in FIG. 8. Herein, rollers 232 are connected between two closed rings 233 to form a roller cage and so the bearing ring 331 constitutes a cage roller bearing. The closed rings 233 consist of an elastically flexible material, for example, steel so that after the removal of cotter pins 145, they can be easily bent apart and the rollers 232 thereby easily exchanged.

Figure 9:
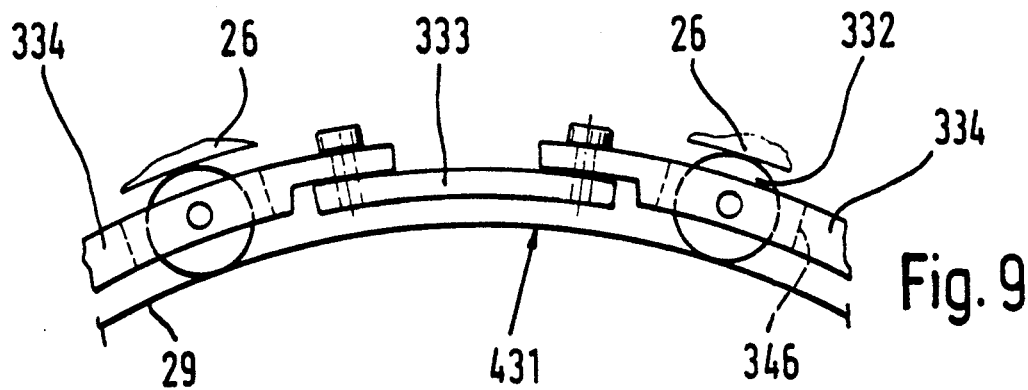
FIG. 9: an illustration of a fifth embodiment of the bearing ring corresponding to FIG. 3, but broken off and considerably enlarged.
Figure 10:
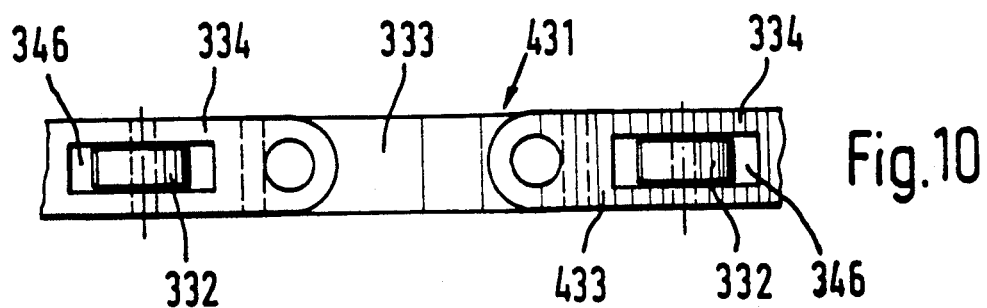
FIG. 10: an illustration of the fifth embodiment of the bearing ring according to FIG. 9 but scaled down.
Figure 11:
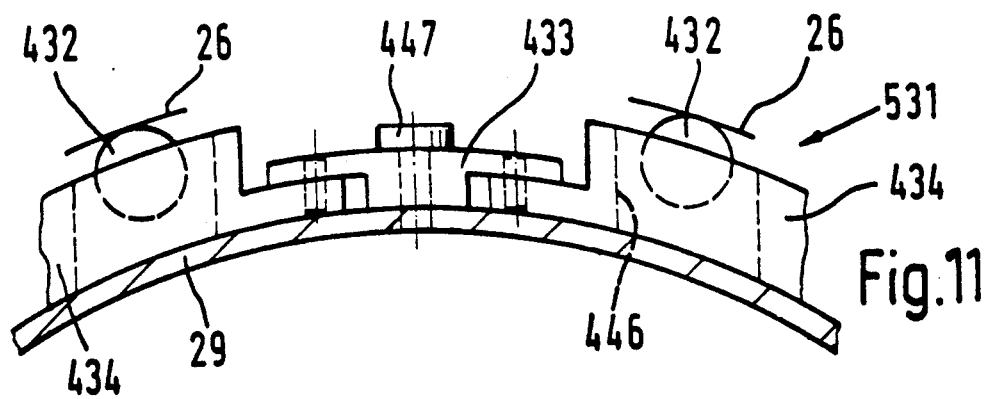
FIGS. 11 and 12: illustrations of a sixth embodiment of the bearing ring corresponding to FIGS. 9 and 10.
Figure 12:
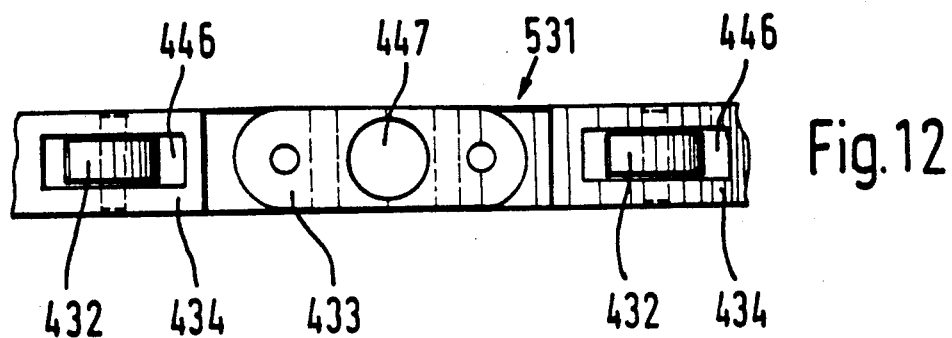

The fifth embodiment of the bearing ring 431 illustrated in FIGS. 9 and 10 comprises ring segments 334 which are articulatedly connected to one another by connecting links 333. The ring segments 334 comprise radially continuous recesses 346 for mounting rollers 332 which protrude radially on either side of the ring segments 334 and are rotatably connected to the ring segments 334. In the sixth embodiment of the bearing ring 531 illustrated in FIGS. 11 and 12, ring segments 434 corresponding to the fifth embodiment according to FIGS. 9 and 10 are connected by means of the links 433 which join them together by, for example, screws 447 to the drum connection piece 29. These ring segments 434 are also provided with recesses 446 in which rollers 432 are rotatably mounted, but these protrude only on the radially outer side of the ring segments 434 out of the ring segments 434 so as to roll on the bearing shell 26.

In the fifth and sixth embodiments of the bearing rings 431 and 531, the entire ring segments 334 and 434 are exchanged.

A single-drum washing machine is illustrated as modified embodiment of the washing machine in FIG. 13. Herein, the drum 115 has an ejection opening 128 for ejection of the washed material on the right-hand side in FIG. 13. As in the above-described embodiment of a washing machine for batches of material passing from one drum to the next, there is connected to the rim of the ejection opening 128 a connection piece 129 by means of which the right end of the drum 115, as described above, is rotatably mounted in the housing opening 124 on the bearing shell 126 by means of a bearing ring, in FIG. 13 a roller chain 231.

In a single-drum washing machine, however, the material to be washed can be introduced radially from above. Therefore, at the left feeding end of the drum, an opening which is coaxial with the axis of rotation of the drum is not required in the end wall 127 of the drum. Hence the drum 115 can be mounted at its feeding end by means of a shaft 148 which engages the gear bearing of a geared motor 117.

For this purpose, there is attached to the end wall 127 of the drum 115 a reinforcement disc 149 on which a flange 151 of the shaft 148 is secured.

In order to mount the geared motor 117, the left terminating wall 152 of the washing machine housing 113 is reinforced by a disc 153 to which a flange 154 of the geared motor 117 is connected. This connection is established by four screws 150 each of which engages an elastomeric sleeve 155 which is bonded to a steel sleeve 156 to form a so-called vibration-damping sleeve. The flange 154 of the geared motor 117 is connected to the steel sleeve 156 at a distance from the terminating wall 152 so that the geared motor 117 and hence also its shaft 148 are elastically resiliently connected to the terminating wall 152.

By virtue of the elastically resilient mounting of the geared motor 117, the drum 115 can be mounted by means of a bearing ring according to the six different embodiments at the right-hand delivery end in FIG. 13 as this elastically resilient mounting can compensate manufacturing tolerances of a coaxial arrangement of the two mountings, which is otherwise difficult to achieve, and also damp the vibrations caused by the turning of the material being washed in the drum. The arrangements of the feed opening in such a radially feedable single-drum washing machine belong to the prior art and are described, for example, in DE-AS (German patent application published after examination) No. 1,194,362 and in the older German patent application P 37 21 083 which does not constitute a prior publication.

In an embodiment not illustrated in the drawings, the bearing ring consists of a piece, for example, a strip which is bent in ring-shaped configuration and made of a material which is suitable as sliding material, for example, a plastic material.

This strip embraces the connection piece 29. Its two ends are releasably held together by, for example, a clamp engaging recesses in the ends of the strip. The exchanging of such a bearing ring is, however, somewhat more complicated than the exchanging of a bearing member of a bearing ring comprised of several bearing members because during the exchanging of the one-piece bearing ring, the drum must be supported from the outside so as to leave a ring-shaped space between the bearing shell and the connection piece for insertion of a new bearing ring.

The actual washing operation and the conveying of the batches of material to be washed from one drum to the next or in the case of the single-drum washing machine possibly from one drum section to the next and removal of the washed material from the washing machine at the delivery end are carried out in a known manner and are, therefore, not described in detail above. Guide vanes serving this purpose are merely indicated in dot-and-dash lines in FIGS. 2 and 13.

The aforegoing description and the drawings relate to the features which are essential to the materialization, by way of example, of the invention. Therefore, insofar as features are disclosed in the description and drawings but are not mentioned in the claims, these serve, if necessary, to also define the subject of the invention.

We claim:

1. Machine for washing material, comprising
    a housing having a cylindrical bearing shell with a bearing surface which is coaxial with a substantially horizontal axis,
    at least one drum with a circumferential wall extending about a drum axis, said circumferential wall surrounding at least partially a drum area for the material to be washed, said drum area having two end walls at least one of which has a drum opening for introduction and/or removal of said material, with a cylindrical drum connection piece surrounding said drum opening, said drum being mounted on said bearing surface for rotation about said substantially horizontal axis by means of said drum connection piece, and
    with a drive by means of which said drum is movable about said horizontal axis,
    characterized in that
    said drum connection piece is mounted on said bearing surface by means of a bearing ring surrounding said drum connection piece,
    and in that
    a housing opening is provided in said housing for exchanging said bearing ring.

2. Washing machine as defined in claim 1, characterized in that said bearing ring comprises releasable bearing members which are exchangeable through said housing opening.

3. Washing machine as defined in claim 2, characterized in that rollers are provided as bearing members.

4. Washing machine as defined in claim 3, characterized in that said rollers are articulatedly connected by links to form a roller chain.

5. Washing machine as defined in claim 3, characterized in that said rollers are connected between two closed rings to form a cage roller bearing.

6. Washing machine as defined in claim 2, characterized in that ring segments are provided as bearing members.

7. Washing machine as defined in claim 6, characterized in that said ring segments comprise rotatably mounted rollers.

8. Washing machine as defined in claim 6, characterized in that said ring segments are articulatedly connected to one another.

9. Washing machine as defined in claim 6, characterized in that said ring segments are attached to said drum connection piece.

10. Washing machine as defined in claim 6, characterized in that said ring segments are designed as sliding elements which form sliding surfaces on the radially outer side thereof.

11. Washing machine as defined in claim 10, characterized in that at least said sliding surfaces of said ring segments consist of a softer material than said bearing surface of said bearing shell.

12. Washing machine as defined in claim 10, characterized in that
    said sliding surface of at least one of said ring segments contains at least one transverse groove with a longitudinal axis,
    and in that
    said longitudinal axis forms an acute angle with said substantially horizontal axis.

13. Washing machine as defined in claim 12, characterized in that
    at least two neighboring drums are provided,
    in that
    at least one bearing shell is provided as bearing for the connection pieces of said neighboring drums which face each other,
    and in that
    said bearing shell has in its lower region and between said two connection pieces a hole which connects said bearing surface with said outer area of said drums.

14. Washing machine as defined in claim 1, characterized in that said bearing shell extends only around the bottom circumference of said drum connection pieces.

15. Washing machine as defined in claim 1, characterized in that
    said drive is arranged on the outside of said housing and comprises a drive gear,
    in that
    said housing is provided with an engagement opening for said drive gear,
    in that
    said drum comprises a gear rim with which said drive gear meshes,
    and in that
    said housing opening is formed by an extension of said engagement opening.

16. Washing machine as defined in claim 1, characterized in that
    said second end wall of said drum is connected to a shaft,
    in that
    a geared motor is provided as said drive, said geared motor being elastically mounted in said housing by means of at least one elastomeric element,
    and in that
    said shaft is mounted in the gearing of said geared motor.

* * * * *